United States Patent
Landon et al.

(10) Patent No.: US 8,597,741 B2
(45) Date of Patent: Dec. 3, 2013

(54) INSULATED GLASS UNIT POSSESSING ROOM TEMPERATURE-CURED SILOXANE SEALANT COMPOSITION OF REDUCED GAS PERMEABILITY

(75) Inventors: Shayne J. Landon, Ballston Lake, NY (US); David A. Williams, Ganesvoort, NY (US); Vikram Kumar, Tarrytown, NY (US); Sachin A. Shelukar, Bangalore (IN); Edward J. Nesakumar, Bangalore (IN); Indumathi Ramakrishnan, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 743 days.

(21) Appl. No.: 12/631,038

(22) Filed: Dec. 4, 2009

(65) Prior Publication Data
US 2010/0098888 A1 Apr. 22, 2010

Related U.S. Application Data

(63) Continuation-in-part of application No. 11/283,382, filed on Nov. 18, 2005, now abandoned.

(51) Int. Cl.
*E06B 3/00* (2006.01)
*E04C 2/54* (2006.01)

(52) U.S. Cl.
USPC ............ 428/34; 428/429; 428/447; 52/786.1; 52/786.13

(58) Field of Classification Search
USPC .............. 428/34, 429, 447; 52/786.1, 786.13; 524/588; 525/446, 464, 474; 528/34
See application file for complete search history.

(56) References Cited

U.S. PATENT DOCUMENTS

| 5,027,574 | A | 7/1991 | Phillip |
| H975 | H | 11/1991 | Selkowitz et al. |
| 5,080,146 | A | 1/1992 | Arasteh |
| 5,082,706 | A | 1/1992 | Tangney |
| 5,120,379 | A | 6/1992 | Noda et al. |
| 5,514,734 | A | 5/1996 | Maxfield et al. |
| 5,544,465 | A | 8/1996 | Hood et al. |
| 5,567,530 | A | 10/1996 | Drujon et al. |
| 5,603,585 | A | 2/1997 | Bruchu et al. |
| 5,744,703 | A | 4/1998 | Krenceski et al. |
| 5,784,853 | A | 7/1998 | Hood et al. |
| 5,804,253 | A | 9/1998 | Hagiwara et al. |

(Continued)

FOREIGN PATENT DOCUMENTS

| CA | 2054854 A1 | 5/1992 |
| DE | 4136689 | 5/1992 |

(Continued)

OTHER PUBLICATIONS

Peter C. LeBaron et al., "Clay Nanolayer Reinforcement of a Silicone Elastomer", Aug. 2001.

(Continued)

*Primary Examiner* — Donald J Loney
(74) *Attorney, Agent, or Firm* — Dilworth & Barrese LLP

(57) ABSTRACT

The invention relates to an insulated glass unit having an increased service life. An outer glass pane and inner glass pane are sealed to a spacer to provide an improved gas impermeable space. The glass unit includes a curable two-part sealer composition which, upon curing, exhibits unexpectedly high adhesion to substrates.

36 Claims, 3 Drawing Sheets

(56) References Cited

U.S. PATENT DOCUMENTS

| | | |
|---|---|---|
| 5,849,832 A | 12/1998 | Virnelson et al. |
| 5,880,197 A | 3/1999 | Beall et al. |
| 6,136,446 A | 10/2000 | Virnelson et al. |
| 6,136,910 A | 10/2000 | Virnelson et al. |
| 6,150,441 A | 11/2000 | Chiba et al. |
| 6,153,691 A | 11/2000 | Gornowicz et al. |
| 6,238,755 B1 | 5/2001 | Harvey et al. |
| 6,284,360 B1 | 9/2001 | Johnson et al. |
| 6,313,220 B1 | 11/2001 | Materne et al. |
| 6,372,827 B2 | 4/2002 | Johnson et al. |
| 6,406,782 B2 | 6/2002 | Johnson et al. |
| 6,445,158 B1 | 9/2002 | Bertness et al. |
| 6,457,294 B1 | 10/2002 | Virnelson et al. |
| 6,686,002 B2 | 2/2004 | Auerbach |
| 6,703,120 B1 | 3/2004 | Ko et al. |
| 6,713,547 B2 | 3/2004 | Barbee et al. |
| 6,784,272 B2 | 8/2004 | Mack et al. |
| 6,812,272 B2 | 11/2004 | Fischer |
| 6,822,035 B2 | 11/2004 | Chaiko |
| 6,828,403 B2 | 12/2004 | Mahdi et al. |
| 6,989,188 B2 * | 1/2006 | Brunnhofer et al. .......... 428/188 |
| 2002/0100550 A1 | 8/2002 | Mahdi et al. |
| 2002/0119266 A1 | 8/2002 | Bagrodia et al. |
| 2002/0194813 A1 | 12/2002 | Virnelson et al. |
| 2004/0127629 A1 | 7/2004 | Jacob et al. |
| 2004/0188016 A1 | 9/2004 | Mahdi et al. |
| 2005/0028459 A1 | 2/2005 | Crandell et al. |
| 2005/0192387 A1 | 9/2005 | Williams et al. |
| 2005/0203235 A1 | 9/2005 | Gong et al. |

FOREIGN PATENT DOCUMENTS

| | | |
|---|---|---|
| EP | 0520777 | 12/1992 |
| EP | 0857761 | 12/2009 |
| EP | 1 464 675 A2 | 7/2012 |
| GB | 2249552 | 5/1992 |
| JP | 11-217243 | 8/1999 |
| JP | 2004-300363 | 10/2004 |
| WO | WO97/31057 | 8/1997 |
| WO | WO02064676 | 8/2002 |

OTHER PUBLICATIONS

Shelly D. Burnside et al., "Nanostructure and Properties of Polysiloxane-Layered Silicate Nanocomposites", Mar. 28, 2000.

K. Mizoguchi et al., "Miscibility and gas permeability of poly (ethylene-co-5, 4 mol% 3,5,5-trimethylhexyl methacrylate)-polydimethyl-siloxane blends", 1997. No month.

Y. Geerts et al., "Morphology and Permeability of Polymer Blends-I. Crosslinked EPDM-Silicone Blends", Feb. 1996.

Office Action dated Jun. 12, 2012 from the Japanese Patent Office for Japanese Patent Application No. 2008-541234.

* cited by examiner

INSULATED GLASS UNIT POSSESSING ROOM TEMPERATURE-CURED SILOXANE SEALANT COMPOSITION OF REDUCED GAS PERMEABILITY

CROSS REFERENCE TO RELATED APPLICATIONS

The present application is a continuation-in-part of U.S. application Ser. No. 11/283,382 filed Nov. 18, 2005, now abandoned, to which priority is claimed and which is herein incorporated by reference.

FIELD OF THE INVENTION

This invention is generally related to thermally insulating structures, and more particularly to a high thermal efficiency, insulated glass unit structure sealed with room temperature cured compositions having reduced permeability to gas, or mixtures of gases.

BACKGROUND OF THE INVENTION

Insulating glass units (IGU) commonly have two panels of glass separated by a spacer. The two panels of glass are placed parallel to each other and sealed at their periphery such that the space between the panels, or the inner space, is completely enclosed. The inner space is typically filled with air. The transfer of energy through an insulating glass unit of this typical construction is reduced, due to the inclusion of the insulating layer of air in the inner space, as compared to a single panel of glass. The energy transfer may be further reduced by increasing the separation between the panels to increase the insulating blanket of air. There is a limit to the maximum separation beyond which convection within the air between the panels can increase energy transfer. The energy transfer may be further reduced by adding more layers of insulation in the form of additional inner spaces and enclosing glass panels. For example three parallel spaced apart panels of glass separated by two inner spaces and sealed at their periphery. In this manner the separation of the panels is kept below the maximum limit imposed by convection effects in the airspace, yet the overall energy transfer can be further reduced. If further reduction in energy transfer is desired then additional inner spaces can be added.

Additionally, the energy transfer of sealed insulating glass units may be reduced by substituting the air in a sealed insulated glass window for a denser, lower conductivity gas. Suitable gases should be colorless, non-toxic, non-corrosive, non-flammable, unaffected by exposure to ultraviolet radiation, and denser than air, and of lower conductivity than air. Argon, krypton, xenon, and sulfur hexaflouride are examples of gases which are commonly substituted for air in insulating glass windows to reduce energy transfer.

Various types of sealants are currently used in the manufacture of insulated glass units including both curing and non-curing systems. Liquid polysulphides, polyurethanes and silicones represent curing systems, which are commonly used, while polybutylene-polyisoprene copolymer rubber based hot melt sealants are commonly used non-curing systems.

Liquid polysulphides and polyurethanes are generally two component systems comprising a base and a curing agent that are then mixed just prior to application to the glass. Silicones may be one component as well as two component systems. Two component systems require a set mix ratio, two-part mixing equipment and cure time before the insulating glass units can be moved onto the next manufacturing stage.

However, these sealant compositions are susceptible to permeability from the low conductivity energy transfer gases (e.g. argon) used to enhance the performance of insulated glass units. As a result of this permeability, the reduced energy transfer maintained by the gas between the panels of glass is lost over time.

There remains a need for sealants with superior barrier protection and even higher thermal insulation stability that overcomes the deficiencies described above, and is highly suitable for applications that are easy to apply and have excellent adhesion.

SUMMARY OF THE INVENTION

An insulated glass unit is provided herein which comprises at least two spaced-apart sheets of glass with a low thermal conductivity gas therebetween and a gas sealant element including a two-part curable sealant composition wherein:

Part 1 comprises (a) at least one silanol terminated first diorganopolysiloxane having a viscosity of from about 1,000 to 200,000 cps at 25 degrees C., and (b) a polymer exhibiting permeability to gas which is less than the permeability of the silanol terminated diorganopolysiloxane (a), and Part 2 comprises (c) at least one trialkylsilyl terminated second diorganopolysiloxane, (d) an alkylsilicate crosslinker, and (e) a crosslinking catalyst.

The composition herein advantageously provides unexpectedly high adhesion to substrates.

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention. All composition percentages are by weight unless indicated otherwise. All ranges given herein are to be interpreted as including all subranges therein.

Figure 1:
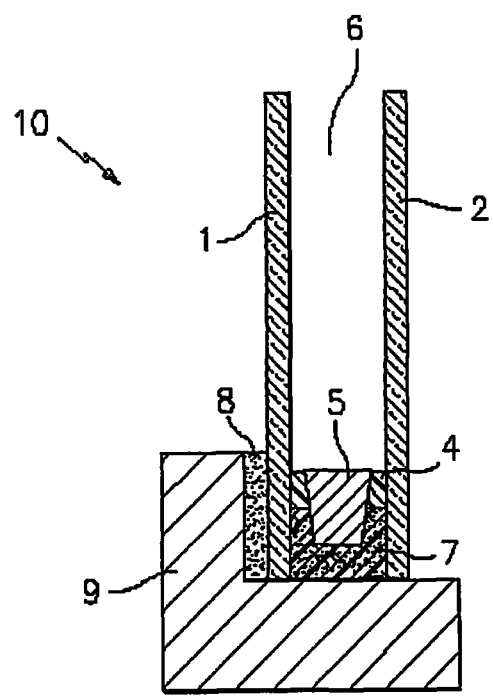
FIG. 1 is a sectional side view of a double glazed insulated glass unit (IGU).

With reference to FIG. 1 an insulated glass unit 10 incorporating a curable sealant composition 7 providing separation of adjacent panes 1, 2 and sealing of the gas impermeable space 6 therebetween is shown. Gases suitable for use in the invention include, for example, air, carbon dioxide, sulfur hexafluoride, nitrogen, argon, krypton, xenon, and mixtures thereof. As those skilled in the art will readily appreciate, the inventive concepts of the present curable sealant composition 7 may be applied in various manners without departing from the spirit of the present invention. For example, it is contemplated that the present curable sealant composition may be used in conjunction with other materials, for example, various types of glass, including, clear float glass, annealed glass, tempered glass, solar glass, tinted glass, and Low-E glass, acrylic sheets and polycarbonate sheets.

In accordance with the present invention, the curable sealant composition 7 is applied in the construction of an insulated glass unit with a double pane glass structure. The insulated glass unit, therefore, generally includes a first glass pane 1 and a second glass pane 2 separated by a continuous spacer 5, a primary sealant 4, and curable sealant composition 7 positioned between the first glass pane 1 and the second glass pane 2. The use of curable sealant composition 7 in accordance with the present invention provides improved gas barrier characteristics and moisture leakage characteristics. As a result, the curable sealant composition 7 provides for longer in service performance of insulated glass units.

The dimensions of continuous spacer 5 will determine the size of the gas impermeable space 6 formed between the first glass 1 and second glass 2 when the sheets of glass are sealed to spacer 5 using primary sealant 4 and curable sealant composition 7 of the present invention. A glazing bead 8, as known in the art, is placed between glass sheets 1 and 2 and window frame 9.

The spacer 5 may be filled with a desiccant that will keep the sealed interior of the gas impermeable space 6 of the insulated glass unit dry. The desiccant should be one which will not adsorb the low thermal conductivity gas or other gases used if a gas mixture is used to fill the interior of the insulated glass unit.

The primary sealant 4 of the insulated glass unit may be comprised of polymeric materials as known in the art. For example, rubber base material, such as polyisobutylene, butyl rubber, polysulfide, EPDM rubber nitrile rubber, or the like. Other materials include, but are not limited to, compounds comprising polyisobutylene/polyisoprene copolymers, polyisobutylene polymers, brominated olefin polymers, copolymers of polisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, and styrene butadiene polymers.

As recited above, the primary sealant 4 can be fabricated of a material such as polyisobutylene, which has very good sealing properties. The glazing bead 8 is a sealant that is sometimes referred to as the glazing bedding and may be in the form of a silicone or butyl. A desiccant may be built into the continuous spacer 5 and is intended to remove moisture from the insulated glass or gas impermeable space between glass pane 1 and glass pane 2.

The present invention unexpectedly provides adhesion about at least as good as standard sealant compositions. Moreover, the invention provides good adhesion to both glass and polyvinyl chloride (PVC) which is typically difficult to adhere to. The invention comprises a two-part formulation. Part 1 of the formulation includes
(a) a first diorganopolysiloxane or blend of diorganopolysiloxanes exhibiting a permeability to a gas or mixture of gases wherein each end of the polymer chain of each of the diorganopolysiloxanes is a silanol terminated, whereby the viscosity of the silanol terminated diorganopolysiloxanes can be from about 1,000 to 200,000 cps at 25 degrees C.; and
(b) a polymer exhibiting permeability to the gas or mixture of gases that is less than the permeability of the silanol terminated diorganopolysiloxane (a).
Part 2 of the formulation includes:
(c) a second diorganopolysiloxane or blend or diorganopolysiloxanes wherein each end of the polymer chain of each of the second diorganopolysiloxanes is trialkylsilyl terminated;
(d) an alkylsilicate crosslinker; and
(e) a cross-linking catalyst.
Part 1 and 2 of the formulation are individually prepared and then combined in a weight ratio of Part 1/Part 2 preferably ranging from about 5:1 to about 20:1, more preferably from about 10:1 to about 15:1, and most preferably from about 12:1 to about 13:1.

The cured composition of the invention exhibits a low permeability to gases. The expression "low permeability to gas(es)" as applied to the cured composition of this invention shall be understood to mean an argon permeability coefficient of not greater than about 900 barrer units (1 barrer=$10^{-10}$ (STP)/cm sec(cm Hg)) measured in accordance with the constant pressure variable-volume method at a pressure of 100 psi and temperature of 25° C. and more preferably not greater than 800 barrer units at a pressure of 100 psi and a temperature of 25° C.

The sealant composition of the present invention may further comprise an optional component, such as, filler, adhesion promoter, non-ionic surfactant, and the like and mixtures thereof.

Regarding Part 1 of the formulation, the silanol terminated diorganopolysiloxane polymer (a), generally has the formula:

$$M_a D_b D'_c$$

with the subscript a=2 and b equal to or greater than 1 and with the subscript c zero or positive where $$M=(HO)_{3-x-y}R^1_x R^2_y SiO_{1/2};$$

with the subscript x=0, 1 or 2 and the subscript y is either 0 or 1, subject to the limitation that x+y is less than or equal to 2, where $R^1$ and $R^2$ are independently chosen monovalent C1 to C60 hydrocarbon radicals; where $$D=R^3 R^4 SiO_{1/2};$$

where $R^3$ and $R^4$ are independently chosen monovalent $C_1$ to $C_{60}$ hydrocarbon radicals; where $$D'=R^5 R^6 SiO_{2/2};$$

where $R^5$ and $R^6$ are independently chosen monovalent $C_1$ to $C_{60}$ hydrocarbon radicals. Silanol terminated diorganopolysiloxanes of the above formula which are useful in the invention are commercially available from Momentive Performance Materials under the designations CRTV941 (30,000 cps) and CRTV 942 (3000 cps).

The curable sealant composition 7 of the present invention further comprises at least one polymer (b) exhibiting permeability to a gas or mixture of gases that is less than the permeability of diorganopolysiloxane polymer (a).

Suitable polymers (b) exhibiting permeability to a gas or mixture of gases that is less than the permeability of diorganopolysiloxane polymer (a) include, inter alia, polyethylenes, such as, low density polyethylene (LDPE), very low density polyethylene (VLDPE), linear low density polyethylene (LLDPE) and high density polyethylene (HDPE); polypropylene (PP), polyisobutylene (PIB), polyvinyl acetate (PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene floride, thermoplastic polyurethane (TPU), acrylonitrile butadiene styrene (ABS), polymethylmethacrylate (PMMA), polyvinyl fluoride (PVF), polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

Polymer (b) of the curable sealant composition 7 can also be elastomeric in nature, examples include, but are not limited to ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These polymers can be blended either alone or in combinations or in the form of copolymers, e.g. polycarbonate-ABS blends, polycarbonate polyester blends, grafted polymers such as, silane grafted polyethylenes, and silane grafted polyurethanes.

In one embodiment of the present invention, the curable sealant composition 7 has a polymer selected from the group consisting of low density polyethylene (LDPE), very low density polyethylene (VLDPE), linear low density polyethylene (LLDPE), high density polyethylene (HDPE), and mixtures thereof. In another embodiment of the invention, the curable sealant composition has a polymer selected from the group consisting of low density polyethylene (LDPE), very low density polyethylene (VLDPE), linear low density polyethylene (LLDPE), and mixture thereof. In yet another embodiment of the present invention, the curable sealant composition polymer is linear low density polyethylene (LLDPE).

In one embodiment of the present invention, the Part 1 of the curable sealant formulation contains from about 20 to about 99 weight percent of the silanol terminated diorganopolysiloxane polymer component (a) and from about 1 to about 80 weight percent polymer (b). In another embodiment of the present invention, Part 1 of the curable sealant composition contains from about 25 to about 70 weight percent diorganopolysiloxane polymer and from about 30 to about 75 weight percent polymer (b). In yet another embodiment of the present invention, Part 1 of the curable sealant composition contains from about 30 to about 60 weight percent diorganopolysiloxane polymer and from about 5 to about 35 weight percent polymer (b).

The blending method of diorganopolysiloxane polymer (a) with polymer (b) may be performed by those methods know in the art, for example, melt blending, solution blending or mixing of polymer powder component (b) in diorganopolysiloxane polymer (a).

Regarding Part 2 of the formulation, the trialkylsilyl terminated diorganopolysiloxane (c) generally has the formula:

with the subscript x=2 and y equal to or greater than 1 and with the subscript z zero or positive where

wherein $R^a R^b$ and $R^c$ can be the same or different and are each individually selected from $C_1$ to $C_{60}$ alkyl hydrocarbon radicals; where

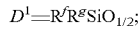

where $R^d$ and $R^e$ are independently chosen monovalent $C_1$ to $C_{60}$ hydrocarbon radicals; where

where $R^f$ and $R^g$ are independently chosen monovalent $C_1$ to $C_{60}$ hydrocarbon radicals.

In one embodiment of the invention $R^a$, $R^b$ and $R^c$ are each methyl. In another embodiment of the invention $R^a$, $R^b$ and $R^c$ are each ethyl.

The trialkylsilyl terminated diorganopolysiloxane (c) can be present in Part 2 of the formulation in a range of from about 30% by weight to about 90% by weight, preferably from about 45% to about 75% by weight and more preferably by about 50% to about 70% by weight of the composition of Part 2 of the formulation.

Optionally, the trialkylsilyl terminated diorganopolysiloxane can also be a component of Part 1 of the formulation ranging from about 0% to about 20% by weight of Part 1.

Suitable cross-linkers (d) for the siloxanes of the curable sealant composition may include an alkylsilicate of the general formula:

$$(R^{14}O)(R^{15}O)(R^{16}O)(R^{17}O)Si$$

where $R^{14}$, $R^{15}$, $R^{16}$ and $R^{17}$ are independently chosen monovalent $C_1$ to $C_{60}$ hydrocarbon radicals.

Crosslinkers useful herein include, but are not limited to, tetra-N-propylsilicate (NPS), tetraethylortho silicate and methyltrimethoxysilane and similar alkyl substituted alkoxysilane compositions, and the like.

In one embodiment of the present invention, the level of incorporation of the alkylsilicate (crosslinker) ranges from about 0.1 weight percent to about 10 weight percent. In another embodiment of the invention, the level of incorporation of the alkylsilicate (crosslinker) ranges from about 0.3 weight percent to about 5 weight percent. In yet another embodiment of the present invention, the level of incorporation of the alkylsilicate (crosslinker) ranges from about 0.5 weight percent to about 1.5 weight percent of the total composition.

Suitable catalysts (e) can be any of those known to be useful for facilitating crosslinking in silicone sealant compositions. The catalyst may include metal and non-metal catalysts. Examples of the metal portion of the metal condensation catalysts useful in the present invention include tin, titanium, zirconium, lead, iron cobalt, antimony, manganese, bismuth and zinc compounds.

In one embodiment of the present invention, tin compounds useful for facilitating crosslinking in curable sealant compositions include: tin compounds such as dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tin-butyrate, and the like. In still another embodiment, tin compounds useful for facilitating crosslinking in the curable sealant composition are chelated titanium compounds, for example, 1,3-propanedioxytitanium bis(ethylacetoacetate); di-isopropoxytitanium bis(ethylacetoacetate); and tetra-alkyl titanates, for example, tetra n-butyl titanate and tetra-isopropyl titanate. In yet another embodiment of the present invention, diorganotin bis β-diketonates is used for facilitating crosslinking in the curable sealant composition.

In one aspect of the present invention, the catalyst is a metal catalyst. In another aspect of the present invention, the metal catalyst is selected from the group consisting of tin compounds, and in yet another aspect of the invention, the metal catalyst is solubilized dibutyl tin oxide.

In one embodiment of the present invention, the level of incorporation of the catalyst, ranges from about 0.001 weight percent to about 1 weight percent of the total composition. In another embodiment off the invention, the level of incorporation of the catalyst, ranges from about 0.003 weight percent to about 0.5 weight percent of the total composition. In yet another embodiment of the present invention, the level of incorporation of the catalyst, ranges from about 0.005 weight percent to about 0.2 weight percent of the total composition.

The curable sealant composition of the present invention may further comprise an alkoxysilane or blend of alkoxysilanes as an adhesion promoter in Part 1 and/or Part 2 of the composition. In one embodiment, the adhesion promoter may be a combination blend of n-2-aminoethyl-3-aminopropyltrimethoxysilane and 1,3,5-tris(trimethoxysilylpropyl)isocyanurate. Other adhesion promoters useful in the present invention include but are not limited to n-2-aminoethyl-3-aminopropyltriethoxysilane, γ-aminopropyltriethoxysilane, γ-aminopropyltrimethoxysilane, aminopropyltrimethoxysilane, bis-γ-trimethoxysilypropypamine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, and n-ethyl-3-trimethoxysilyl-2-methylpropanamine, and the like.

The level of incorporation of the alkoxysilane (adhesion promoter) ranges from about 0.1 weight percent to about 20 weight percent of the total compensation. In one embodiment of the invention, the adhesion promoter ranges from about 0.3 weight percent to about 10 weight percent of the total composition. In another embodiment of the invention, the adhesion promoter ranges from about 0.5 weight percent to about 2 weight percent of the total composition.

The curable sealant composition of the present invention may also comprise a filler in Part 1 and/or Part 2 of the composition. Suitable fillers of the present invention include but are not limited to ground, precipitated and colloidal calcium carbonates which is treated with compounds such as stearate or stearic acid; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite or clays such as kaolin, bentonite or montmorillonite, and the like.

In one embodiment of the present invention, the filler is a calcium carbonate filler, silica filler or a mixture thereof. The type and amount of filler added depends upon the desired physical properties for the cured silicone composition. In another embodiment of the invention, the amount of filler is from 0 weight percent to about 80 weight percent of the total composition. In yet another embodiment of the invention, the amount of filler is from about 10 weight percent to about 60 weight percent of the total composition. In still another embodiment of the invention, the amount of filler is from about 30 weight percent to about 55 weight percent of the total composition. The filler may be a single species or a mixture of two or more species.

In a further embodiment of the present invention, the curable sealant composition contains in part 1 and/or Part 2 an inorganic substance from the general class of so called "nanoclays" or "clays." "Organo-clays" are clays or other layered materials that have been treated with organic molecules (also called exfoliating agents) capable of undergoing ion exchange reactions with the cations present at the interlayer surfaces of the layers.

In one embodiment of the invention, the clay materials used herein include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, as well as vermiculite, halloysite, aluminate oxides, or hydrotalcite, and the like and mixtures thereof. In another embodiment, other useful layered materials include micaceous minerals, such as illite and mixed layered illite/smectite minerals, such as rectorite, tarosovite, ledikite and admixtures of illites with the clay minerals named above. Any swellable layered material that sufficiently sorbs the organic molecules to increase the interlayer spacing between adjacent phyllosilicate platelets to at least 5 angstroms, or to at least 10 angstroms, (when the phyllosilicate is measured dry) may be used in the practice of this invention.

The aforementioned particles can be natural or synthetic such as smectite clay. This distinction can influence the particle size and for this invention, the particles should have a lateral dimension of between 0.01 μm and 5 μm, and preferably between 0.05 μm and 2 μm, and more preferably between 0.1 μm and 1 μm. The thickness or the vertical dimension of the particles can vary between 0.5 nm and 10 nm, and preferably between 1 nm and 5 nm.

In still another embodiment of the present invention, organic and inorganic compounds useful for treating or modifying the clays and layered materials include cationic surfactants such as ammonium, ammonium chloride, alkylammonium (primary, secondary, tertiary and quaternary), phosphonium or sulfonium derivatives of aliphatic, aromatic or arylaliphatic amines, phosphines or sulfides. Such organic molecules are among the "surface modifiers" or "exfoliating agents" discussed herein. Additional organic or inorganic molecules useful for treating the clays and layered materials include amine compounds (or the corresponding ammonium ion) with the structure $R^3R^4R^5N$, wherein $R^3$, $R^4$, and $R^5$ are $C_1$ to $C_{30}$ alkyls or alkenes in one embodiment, $C_1$ to $C_{20}$ alkyls or alkenes in another embodiment, which may be the same or different. In one embodiment, the organic molecule is a long chain tertiary amine where $R^3$ is a $C_{14}$ to $C_{20}$ alkyl or alkene. In another embodiment, $R^4$ and or $R^5$ may also be a $C_{14}$ to $C_{20}$ alkyl or alkene. In yet another embodiment of the present invention, the modifier can be an amine with the structure $R^6R^7R^8N$, wherein $R^6$, $R^7$, and $R^8$ are $C_1$ to $C_{30}$ alkoxy silanes or combination of $C_1$ to $C_{30}$ alkyls or alkenes and alkoxy silanes.

Suitable clays that are treated or modified to form organo-clays include, but are not limited to, montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and mixtures thereof. The organo-clays of the present invention may further comprise one or more of ammonium, primary alkylammonium, secondary alkylammonium, tertiary alkylammonium quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. In one embodiment of the present invention, the organo-clay is an alkyl ammonium modified montmorillonite.

The amount of clay incorporated in the sealant composition of the present invention in accordance with embodiments of the invention, is preferably an effective amount to provide decrease the sealant's permeability to gas. In one embodiment of the present invention, the sealant composition of the present invention contains from 0 to about 50 weight percent nano-clay. In another embodiment, the compositions of the present invention have from about 1 to about 20 weight percent nano-clay The clays can be used alone or in combination with the low density linear polymers mentioned above.

The curable sealant composition of the present invention may optionally comprise in Part 1 and/or Part 2 a non-ionic surfactant compound selected from the group of surfactants consisting of polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof in an amount ranging from slightly above 0 weight percent to about 10 weight percent, more preferably from about 0.1 weight percent to about 5 weight percent, and most preferably from about 0.5 weight percent to about 0.75 weight percent of the total composition.

The curable sealant composition of the present invention may be prepared using other ingredients that are conventionally employed in room temperature vulcanizing (RTV) silicone compositions such as colorants, pigments and plasticizers, as long as they do not interfere with the desired properties.

Furthermore, these compositions can be prepared using melt, solvent and in-situ polymerization of siloxane polymers as known in the art.

Preferably, the methods of blending the diorganopolysiloxane polymers with polymers may be accomplished by contacting the components in a tumbler or other physical blending means, followed by melt blending in an extruder. Alternatively, the components can be melt blended directly in an extruder, Brabender or any other melt blending means.

Figure 2:
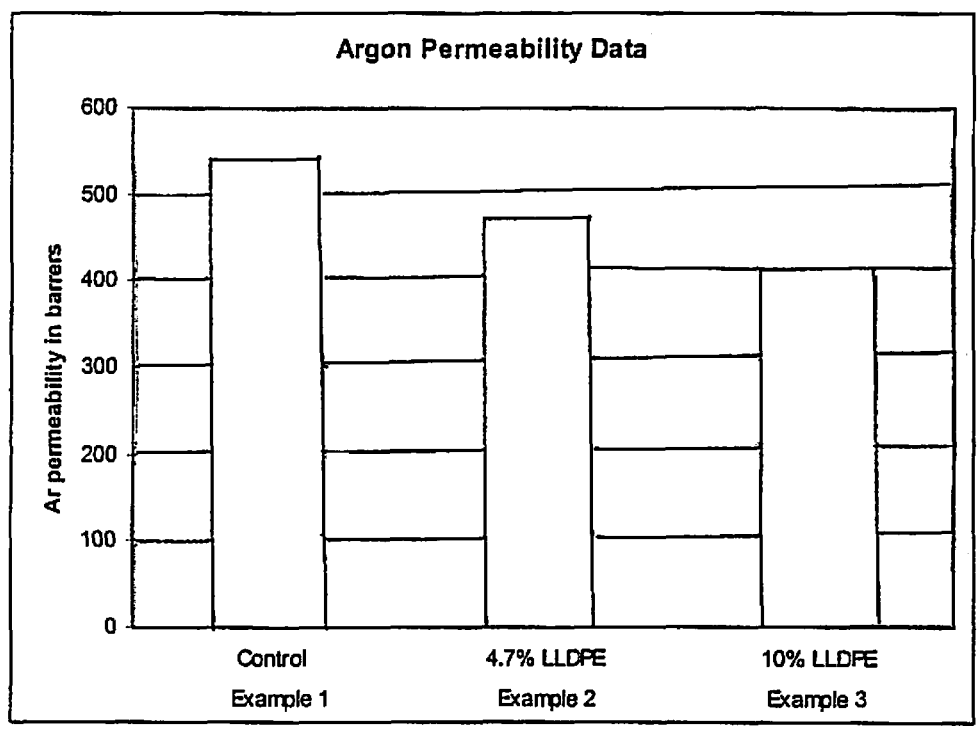
FIGS. 2 and 3 are charts showing argon permeability data.

The curable sealant composition of the invention is illustrated by the following non-limiting examples. The argon (Ar) permeability of the Examples was measured using a gas permeability set-up. The measurements were based on the variable-volume method at 100 psi and 25 degrees C. Measurements were repeated under identical conditions for 2-3 times to ensure their reproducibility. The variable-volume method measures Ar permeability in "barrer" units (0.0 to 1,200.0). All of the Examples of the invention exhibited barrer units below 900. The Ar permeability results are depicted in FIG. 2.

Example 1 (Comparative)

The formation of this Example is a control and does not exemplify the invention, but is presented for purposes of comparison. Formulation 1 was prepared by combining a silanol terminated diorganopolysiloxane mixture of CRTV 941 (30,000 cps) and CRTV942 (3,000) cps, with stearic acid treated calcium carbonate in a 1:1 weight ratio (i.e., 50% of each component) to provide Part 1.

Part 2 was provided by combining 63.3% by weight of trimethylsilyl terminated diorganopolysiloxane, i.e., Viscasil® (10,000 cps) commercially available from Momentive Performance Materials, Inc., with 8% carbon black, 15% aminopropyl triethoxysilane, 13% tetra-N-propylsilicate and 0.7% solubilized dibutyltin oxide.

Parts 1 and 2 were then mixed in a static mixer in a Part 1/Part 2 weight ratio of 12.5:1. The composition of Formulation 1 is summarized below in Table 1.

Formulation 1 was then tested for adhesion using H-block test specimens composed of aluminum on one side and glass on the other side with the Formulation 1 sealant in between. More particularly, tensile adhesion data was generated using ASTM test C1135 using test panels comprising 1 inch×3 inch×0.25 inch anodized aluminum and glass substrates with a spacer therebetween forming a 0.5 inch×0.5 inch×2 inch sealant cavity. The sealant was cured at 23° and 50% humidity (RH) for 7 days. The test results for Formulation 1 included a cohesive failure of 100% (which indicates that the sealant broke before the bond to either the aluminum or glass substrates broke). The tensile strength was 111 psi elongation was 102% and the 50% modulus was 74 psi. The test data for Formulation 1 is summarized in Table 2 below. This formulation exhibited an Ar permeability of 539.00 barrer units.

Example 2

The formulation of this Example exemplifies the invention. Formulation 2 was prepared by combining 45.3 parts by weight of a silanol terminated diorganopolysiloxane mixture of CRTV941 and CRTV942; 50 parts by weight of a stearic acid treated calcium carbonate and 4.7 parts by weight of a linear low density polyethylene (LLDPE) in a continuous extrusion process to provide Part 1 of the formulation.

Part 2 of the formulation was provided with the same components and percentage composition as in Formulation 1 of Example 1.

Parts 1 and 2 of Formulation 2 were combined in a static mixer in Part 1/Part 2 weight ratio of 12.5:1 as in Example 1. The composition of Formulation 2 is summarized in Table 1 below.

Formulation 2 was tested for adhesion in the same manner as in Example 1. Formulation 2 exhibited a cohesive failure of 100%, a tensile strength of 111 psi, an elongation of 85%, and a 50% modulus of 86 psi. The test data for Formulation 2 is summarized in Table 2 below. This formulation exhibited an Ar permeability of 468.93 barrer units.

Example 3

The formulation of this Example exemplifies the invention. Formulation 3 was prepared by combining 40.0 parts by weight of the silanol terminated diorganopolysiloxane of Example 2, 50.0 parts by weight of the stearic acid treated calcium carbonate, and 10.0 parts by weight of the same linear low density polyethylene (LLPDE) as in Example 2 and in the same manner as in Example 2 to provide Part 1 of Formulation 3.

Part 2 of Formulation 3 was provided with the same components and percentage composition as in Formulation 1 of Example 1.

Parts 1 and 2 of Formulation 3 were combined in a static mixer in a Part 1/Part 2 weight ratio of 12.5:1 as in Example 1. The composition of Formulation 3 is summarized in Table 1 below.

Formulation 3 was tested for adhesion in the same manner as in Example 1. Formulation 3 exhibited a cohesive failure of 100%, a tensile strength of 107 psi, an elongation of 68%, and a 58% modulus of 96 psi. The test data for Formulation 3 is summarized in Table 2 below. This formulation exhibited an Ar permeability of 404.25 barrer units.

Example 4 (Comparative)

The formulation of this Example is a control and does not exemplify the invention. Formulation 4 was prepared with the same components and in the same percentage composition as Formulation 1 of Example 1. The composition of Formulation 4 is summarized in Table 1 below.

Formulation 4 was tested for adhesion in the same manner as Example 1 and exhibited a cohesive failure of 100%, a tensile strength of 106 psi, an elongation of 95%, and a 50% modulus of 72 psi. The test data for Formulation 4 is summarized in Table 2 below. This formulation exhibited an Ar permeability of 532.10 barrer units.

As can be seen from the above Examples 1 to 4, in comparison to the control Formulations 1 and 4, Formulations 2 and 3 of the invention show only minor differences in elasticity and only slightly higher modulus while tensile strength is substantially unchanged. More significantly, the adhesion to glass and aluminum is unchanged as reflected by the 100% cohesive failure rate, i.e. the sealant broke before the bond to the substrates. It is entirely unexpected that a polymer, such as those listed above for component (b) of the formulation, can be incorporated into the formulation while not reducing the adhesiveness of the sealant to the substrates.

Parts 1 and 2 were combined in a static mixer at a Part 1/Part 2 weight ratio of 12.5:1. The composition of Formulation 5 is summarized below in Table 3.

Formulation 5 was then tested for lap shear adhesion in accordance with WPSTM test C-1221. The lap shear adhesion data was generated using 1 inch×3 inch coupons comprising polyvinylchloride (PVC) and glass substrates (i.e., PVC-to-PVC and glass-to-glass lap shear test specimens). The test specimens were prepared using a jig assembly to give a bond line thickness of 1/16 inch and a 0.5 inch overlap. The surfaces of all substrates were pre-cleaned with liquid detergent and water solution and then wiped dry with a clean cloth. The sealant was applied to the substrates and cured at 23° C. and 50% relative humidity for 24 hours.

Formulation 5 exhibited a cohesiveness failure of 100% with respect to both. PVC and glass substrate and an adhesive strength of 122 psi. These results are summarized below in Table 4.

TABLE 1

| Ingredients (weight %) | Formulation 1 (Control) | Formulation 2 | Formulation 3 | Formulation 4 (Control) |
|---|---|---|---|---|
| Part 1 | | | | |
| Silanol terminated diorganopolysiloxane | 50.0 | 45.3 | 40.0 | 50.0 |
| Stearic acid treated calcium carbonate | 50.0 | 50.0 | 50.0 | 50.0 |
| Linear low density polyethylene (LLDPE) | — | 4.7 | 10.0 | — |
| Part 2 | | | | |
| Trimethylsilyl terminated diorganopolysiloxane | 63.3 | 63.3 | 63.3 | 63.3 |
| Carbon Black | 8 | 8 | 8 | 8 |
| Aminopropyltriethoxysilane | 15 | 15 | 15 | 15 |
| Tetra-N-propylsilicate | 13 | 13 | 13 | 13 |
| Solubilized Dibutyltin Oxide | 0.7 | 0.7 | 0.7 | 0.7 |

TABLE 2

| | Cohesive Failure % | Tensile Strength | Elongation | 50% Modulus |
|---|---|---|---|---|
| Formulation 1 | 100 | 111 | 102 | 74 |
| Formulation 2 | 100 | 111 | 85 | 86 |
| Formulation 3 | 100 | 107 | 68 | 96 |
| Formulation 4 | 100 | 106 | 95 | 72 |

Example 5 (Comparative)

The formulation of this Example is a control and does not exemplify the invention but is presented for the purposes of comparison. Formulation 5 was prepared by combining 42.8 parts by weight of the silanol terminated diorganopolysiloxane of Example 2, 45.0 parts by weight of stearic acid treated calcium carbonate, 0.7 parts by weight of polyalkyleneoxide organosilicone copolymer as a non-ionic surfactant, and 11.5 parts by weight of trimethylsilyl terminated polydimethyl siloxane in a continuous extrusion process, to provide Part 1 of the formulation.

Part 2 of Formulation 5 was prepared by combining 56.13 parts by weight of trimethylsilyl terminated diorganopolysiloxane, 11.5 parts by weight of octamethylcyclotetrasiloxane treated fumed silica, 0.37 parts of weight of carbon black, 15.9 parts by weight of aminoethyl aminopropyl trimethoxysilane, 4.0 parts by weight of tris-(trimethoxysilyl) propyl isocyanurate, 11.63 parts by weight of tetra-N-propylsilate and 0.47 parts by weight of dibutyltin dilaurate.

Example 6

The formulation for this Example exemplifies the invention. Formulation 6 was prepared by combining 38.8 parts by weight of the silanol terminated diorganopolysiloxane of Example 2, 45.0 parts by weight of stearic acid treated calcium carbonate, 0.7 parts by weight of polyalkyleneoxide organosilicone co-polymer, 11.5 parts by weight of trimethylsily terminated polydimethylsiloxane, and 4.0 parts by weight of LLDPE to provide Part 1 of Formulation 6.

Part 2 of formulation 6 was prepared with the same components and percentage composition as Part 2 of Formulation 5. The composition of Formulation 6 is summarized in Table 3 below.

Parts 1 and 2 were then combined and tested in the same manner as in Example 5. Formulation 6 exhibited a cohesive failure of 100% with respect to both PVC and glass substrates and an adhesion strength of 119 psi. These results are summarized in Table 4 below.

Example 7

The formulation for this Example exemplifies the invention. Formulation 7 was prepared by combining 38.8 parts by weight of the silanol terminated diorganopolysiloxane of Example 2, 40.5 parts by weight of stearic acid treated calcium carbonate, 0.7 parts by weight of polyalkyleneoxide organosilicone co-polymer, 11.5 parts by weight of trimethylsily terminated polydimethylsiloxane, and 8.5 parts by weight of LLDPE to provide Part 1 of Formulation 7.

Part 2 of formulation 7 was prepared with the same components and percentage composition as Part 2 of Formulation 5. The composition of Formulation 7 is summarized in Table 3 below.

Parts 1 and 2 were then combined and tested in the same manner as in Example 5. Formulation 7 exhibited a cohesive failure of 100% with respect to both PVC and glass substrates and an adhesion strength of 104 psi. These results are summarized in Table 4 below.

Example 8

The formulation for this Example exemplifies the invention. Formulation 8 was prepared by combining 34.3 parts by weight of the silanol terminated diorganopolysiloxane of Example 2, 45.0 parts by weight of stearic acid treated calcium carbonate, 0.7 parts by weight of polyalkyleneoxide organosilicone co-polymer, 11.5 parts by weight of trimethylsily terminated polydimethylsiloxane, and 8.5 parts by weight of LLDPE to provide Part 1 of Formulation 8.

Part 2 of formulation 8 was prepared with the same components and percentage composition as Part 2 of Formulation 5. The composition of Formulation 8 is summarized in Table 3 below.

Parts 1 and 2 were then combined and tested in the same manner as in Example 5. Formulation 8 exhibited a cohesive failure of 100% with respect to both PVC and glass substrates and an adhesion strength of 119 psi. These results are summarized in Table 4 below.

Example 9

The formulation for this Example exemplifies the invention. Formulation 9 was prepared by combining 38.8 parts by weight of the silanol terminated diorganopolysiloxane of Example 2, 33.0 parts by weight of stearic acid treated calcium carbonate, 0.7 parts by weight of polyalkyleneoxide organosilicone co-polymer, 11.5 parts by weight of trimethylsily terminated polydimethylsiloxane, and 16.0 parts by weight of LLDPE to provide Part 1 of Formulation 9.

Part 2 of formulation 9 was prepared with the same components and percentage composition as Part 2 of Formulation 5. The composition of Formulation 9 is summarized in Table 3 below.

Parts 1 and 2 were then combined and tested in the same manner as in Example 5. Formulation 9 exhibited a cohesive failure of 100% with respect to both PVC and glass substrates and an adhesion strength of 75 psi. These results are summarized in Table 4 below.

TABLE 4

|  | PVC Cohesive Failure % | Glass Cohesive Failure % | Adhesion strength psi |
|---|---|---|---|
| Formulation 5 | 100 | 100 | 122 |
| Formulation 6 | 100 | 100 | 119 |
| Formulation 7 | 100 | 100 | 104 |
| Formulation 8 | 100 | 100 | 119 |
| Formulation 9 | 100 | 100 | 75 |

The adhesion of inventive formulations 6-9 incorporating LLDPE in a range of from 4.0% to 16% of Part 1 are substantially the same as the control Formulation 5 except that Formulation 9 does show some loss of adhesive strength (i.e., 75 psi vs. 122 psi for the control Formulation 5 without LLDPE). Nevertheless the failure mode remained 100% cohesive failure (i.e., the sealant advantageously failed prior to the bond line).

Example 10

Formulation 10 was prepared by combining 50 parts by weight of the silanol terminated diorganopolysiloxane of Example 2 with 45.5 parts by weight of stearic acid treated calcium carbonate and 5.0 parts nanoclay to provide part 1 of the formulation.

Figure 3:
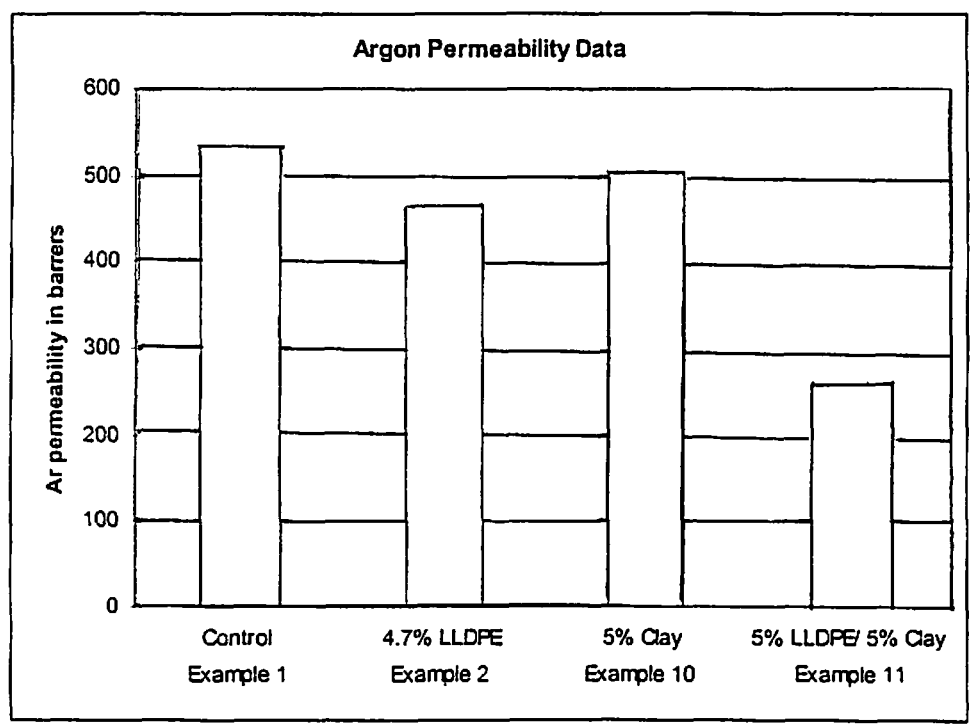

Part 2 of the formulation was prepared with the same components and in the same manner as Formulation 1. This formulation exhibited an Argon permeability of about 509 barrer units. The composition of Formulation 10 as well as for Formulations 1 and 2 are summarized in Table 5. The test data for Formulation 10 as well as for Examples 1 and 2 are presented in FIG. 3.

Example 11

Formulation 11 was prepared by combining 45 parts by weight of the silanol terminated diorganopolysiloxane of Example 2 with 45 parts by weight of stearic acid treated calcium carbonate, 5 parts by weight of the same linear low density polyethylene (LLDPE) of Example 2 and 5.0 parts by weight of nanoclay to provide Part 1 of the formulation.

Part 2 of the formulation was prepared with the same components and in the same manner as Formulation 1. This formulation exhibited Argon permeability of about 268 barrer units. The composition of Formulation 11 is summarized in Table 5. The Argon permeability of Formulation 11, together with the test data for Formulations 1, 2 and 10, are presented in FIG. 3.

TABLE 3

| Ingredients (weight %) | Formulation 5 (Control) | Formulation 6 | Formulation 7 | Formulation 8 | Formulation 9 |
|---|---|---|---|---|---|
| Part 1 |  |  |  |  |  |
| Silanol terminated diorganopolysiloxane | 42.8 | 38.8 | 38.8 | 34.3 | 38.8 |
| Stearic acid treated calcium carbonate | 45.0 | 45.0 | 40.5 | 45.0 | 33 |
| Polyalkyleneoxide organosilicone co-polymer | 0.7 | 0.7 | 0.7 | 0.7 | 0.7 |
| Trimethylsilyl terminated polydimethylsiloxane | 11.5 | 11.5 | 11.5 | 11.5 | 11.5 |
| Linear low density polyethylene (LLDPE) | — | 4.0 | 8.5 | 8.5 | 16.0 |
| Part 2 |  |  |  |  |  |
| Trimethylsilyl terminated diorganopolysiloxane | 56.13 | 56.13 | 56.13 | 56.13 | 56.13 |
| Octamethylcyclotetrasiloxane treated fumed silica | 11.5 | 11.5 | 11.5 | 11.5 | 11.5 |
| Carbon Black | 0.37 | 0.37 | 0.37 | 0.37 | 0.37 |
| Aminoethylaminopropyltrimethoxysilane | 15.9 | 15.9 | 15.9 | 15.9 | 15.9 |
| Tris-(trimethoxysilyl)propyl isocyanurate | 4.0 | 4.0 | 4.0 | 4.0 | 4.0 |
| Tetra-N-propylsilicate | 11.63 | 11.63 | 11.63 | 11.63 | 11.63 |
| Dibutyltin Oxide | 0.47 | 0.47 | 0.47 | 0.47 | 0.47 |

TABLE 5

| Ingredients (weight %) | Formulation 1 (Control) | Formulation 2 | Formulation 10 | Formulation 11 |
|---|---|---|---|---|
| Part 1 | | | | |
| Silanol terminated diorganopolysiloxane | 50.0 | 45.3 | 50.0 | 45.0 |
| Stearic acid treated calcium carbonate | 50.0 | 50.0 | 45.0 | 45.0 |
| Linear low density polyethylene (LLDPE) | — | 4.7 | — | 5.0 |
| Nano Clay | — | — | 5.0 | 5.0 |
| Part 2 | | | | |
| Trimethylsilyl terminated diorganopolysiloxane | 63.3 | 63.3 | 63.3 | 63.3 |
| Carbon Black | 8 | 8 | 8 | 8 |
| Aminopropyltriethoxysilane | 15 | 15 | 15 | 15 |
| Tetra-N-propylsilicate | 13 | 13 | 13 | 13 |
| Solubilized Dibutylltin Oxide | 0.7 | 0.7 | 0.7 | 0.7 |

Examples 10 and 11 illustrate the unexpected results obtained by including a nanoclay in the formula together with linear low density polyethylene. The Argon permeability of Formulation 11 was less than half that of control formulation 1, and even less than 60% that of Formulation 2 of the invention without the nanoclay. These are surprisingly advantageous results.

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. An insulated glass unit comprising at least two spaced-apart sheets of glass in spaced relationship to each other, a low thermal conductivity gas therebetween and a gas sealant element including a two-part curable sealant composition wherein Part 1 comprises (a) at least one first diorganopolysiloxane exhibiting a permeability to a gas or a mixture of gases wherein each end of the polymer chain of each of the first diorganopolysiloxanes is silanol terminated, wherein the viscosity of the silanol terminated first diorganopolysiloxanes can be from about 1,000 to 200,000 cps at 25 degrees C., and (b) a polymer exhibiting permeability to the gas or mixture of gases that is less than the permeability of the silanol terminated first diorganopolysiloxane (a); and, Part 2 comprises (c) at least one second diorganopolysiloxane wherein each end of the polymer chain of each of the second diorganopolysiloxane is trialkylsilyl terminated, (d) an alkylsilicate crosslinker, and (e) a crosslinking catalyst;

wherein said two-part curable sealant composition when cured has a permeability to argon of no more than about 900 barrer units at 25 degrees C. and under 100 psi pressure.

2. The insulated glass unit window of claim 1 wherein the diorganopolysiloxane polymer, component (a), is a silanol terminated diorganopolysiloxane having the formula:

$$M_a D_b D'_c$$

wherein a=2, b is equal to or greater than 1, c is zero or a positive integer;

$$M = (HO)_{3-x-y} R^1_x R^2_y SiO_{1/2};$$

wherein x=0, 1 or 2 and y is either 0 or 1, with the proviso that x+y is less than or equal to 2, $R^1$ and $R^2$ are monovalent $C_1$ to $C_{60}$ hydrocarbon radicals;

$$D = R^3 R^4 SiO_{1/2};$$

wherein $R^3$ and $R^4$ are monovalent $C_1$ to $C_{60}$ hydrocarbon radicals; and $$D' = R^5 R^6 SiO_{2/2};$$

wherein $R^5$ and $R^6$ are independently chosen monovalent $C_1$ to $C_{60}$ hydrocarbon radicals.

3. The insulated glass unit of claim 1 wherein polymer (b) is selected from the group consisting of low density polyethylene (LDPE), very low density polyethylene (VLDPE), linear low density polyethylene (LLDPE), high density polyethylene (HDPE), polypropylene (PP), polyisobutylene (PIB), polyvinyl acetate (PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene floride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (AMPS), and mixture thereof.

4. The insulated glass unit of claim 3 wherein polymer (b) is selected from the group consisting of low density polyethylene (LDPE), very low density polyethylene (VLDPE), linear low density polyethylene (LLDPE), high density polyethylene (HDPE), and mixtures thereof.

5. The insulated glass unit of claim 4 wherein polymer (b) is selected from the group consisting of low density polyethylene (LDPE), very low density polyethylene (VLDPE), linear low density polyethylene (LLDPE), and mixture thereof.

6. The insulated glass unit of claim 5 wherein polymer (b) is linear low density polyethylene (LLDPE).

7. The insulated glass unit of claim 1 wherein the trialkylsilyl terminated second diorganopolysiloxane component (c) has the formula:

$$M_x D_y D^1_z$$

wherein x=2, y is equal to or greater than 1, z is zero or a positive integer;

$$M = R^a R^b R^c SiO_{1/2}$$

wherein $R^a$, $R^b$ and $R^c$ can be the same or different and are each individually selected from $C_1$ to $C_{60}$ alkyl hydrocarbon radicals, $$D = R^d R^e SiO_{1/2};$$

wherein $R^d$ and $R^e$ are independently chosen monovalent $C_1$ to $C_{60}$ hydrocarbon radicals; and $$D^1 = R^f R^g SiO_{2/2};$$

wherein $R^f$ and $R^g$ are independently chosen monovalent $C_1$ to $C_{60}$ hydrocarbon radicals.

8. The insulated glass unit of claim 7 wherein the trialkylsilyl terminated second diorganopolysiloxane component (c) is trimethylsilyl terminated polydimethylsiloxane.

9. The insulated glass unit of claim 7 wherein Part 1 of the formulation also includes the trialkylsilyl terminated diorganopolysiloxane component (c).

10. The insulated glass unit of claim 9 wherein the trialkylsilyl terminated diorganopolysiloxane component (c) in both Part 1 and Part 2 of the formulation is trimethyl terminated polydimethylsiloxane.

11. The insulated glass unit of claim 1 containing at least one optional component selected from the group consisting of filler, adhesion promoter, non-ionic surfactant.

12. The insulated glass unit of claim 1 wherein the catalyst is a tin catalyst.

13. The insulated glass unit of claim 12 wherein the tin catalyst is selected from the group consisting of dibutyltindilaurate, dibutyltindiacetate, dibutyltindimethoxide tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin trisuberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates and mixtures thereof.

14. The insulated glass unit of claim 11 wherein the adhesion promoter is selected from the group consisting of n-2-aminoethyl-3-aminopropyltrimethoxysilane, 1,3,5-tris(trimethoxysilylpropyl)isocyanurate, γ-aminopropyltriethoxysilane, γ-aminopropyltrimethoxysilane, aminopropyltrimethoxysilane, bis-γ-trimethoxysilypropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexy)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, n-ethyl-3-trimethoxysilyl-2-methylpropanamine, and mixtures thereof.

15. The insulated glass unit of claim 11 wherein the weight ratio of Part 1 to Part 2 of the composition ranges from about 10:1 to about 15:1.

16. The insulated glass unit of claim 1 wherein the weight ratio of Part 1 to Part 2 of the composition ranges from about 12:1 to about 13:1.

17. The insulated glass unit of claim 1 wherein the silanol terminated diorganopolysiloxane polymer, component (a), ranges from an amount from about 50 weight percent to about 99 weight percent of the composition of Part 1.

18. The insulated glass unit of claim 1 wherein the amount of the polymer, component (b), ranges from about 1 weight percent to about 50 weight percent of the composition of Part 1.

19. The insulated glass unit of claim 1 wherein the trialkylsilyl terminated diorganopolysiloxane component (c) ranges in an amount of from 30% to about 90% by weight of the composition of Part 2.

20. The insulated glass unit of claim 11 wherein the composition includes one or more filler selected from the group consisting of clays, nano-clays, organo-clays, ground calcium carbonate, precipitated calcium carbonate, colloidal calcium carbonate, calcium carbonate treated with compounds stearate or stearic acid; fumed silica, precipitated silica, silica gels, hydrophobized silicas, hydrophilic silica gels: crushed quartz, ground quartz, alumina, aluminum hydroxide, titanium hydroxide, clay, kaolin, bentonite montmorillonite, diatomaceous earth, iron oxide, carbon black and graphite, talc, mica, and mixtures thereof.

21. The insulated glass unit of claim 11 wherein the composition including a non-ionic surfactant selected from the group consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof, in an amount ranging from about 0.1 weight percent to about 10 weight percent of the total composition.

22. The insulated glass unit of claim 21 wherein the non-ionic surfactant is selected from the group of surfactants consisting of copolymers of ethylene oxide and propylene oxide, copolymers of silicones and polyethers, copolymers of silicones and copolymers of ethylene oxide and propylene oxide and mixtures thereof.

23. The insulated glass unit of claim 1 wherein the amount of the cross-linker, component (d), ranges in amount from about 0.1 weight percent to about 10 weight percent of the total composition.

24. The insulated glass unit of claim 1 wherein the amount of catalyst, component (e), ranges in amount from about 0.005 weight percent to about 1 weight percent of the total composition.

25. The insulated glass unit of claim 20 wherein the composition includes a clay modified with an amine compounds or ammonium ion having the structure $R^3 R^4 R^5 N$, wherein $R^3$, $R^4$, and $R^5$ are $C_1$ to $C_{30}$ 30 alkyls or alkenes, and mixtures thereof.

26. The insulated glass unit of claim 20 wherein the sealant composition includes a clay modified with an amine or ammonium ion having the structure $R^6 R^7 R^8 N$, wherein at least one $R^6$, $R^7$, and $R^8$ is $C_1$ to $C_{30}$ alkoxy silanes and the remaining are $C_1$ to $C_{30}$ alkyls or alkenes.

27. The insulated glass unit of claim 22 wherein the composition includes a clay modified with ammonium, primary alkylammonium, secondary alkylammonium, tertiary alkylammonium quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

28. The insulated glass unit of claim 15 wherein the clay is present in an amount from about 0.1 to about 50 weight percent of the total composition.

29. The insulated glass unit of claim 1 wherein the gas is selected from the group consisting of air, carbon dioxide, sulfur hexafloride, nitrogen, argon, krypton, xenon, and mixtures thereof.

30. The insulated glass unit of claim 1 further comprising a primary sealant.

31. The insulated glass unit of claim 1 further comprising a glazing bead.

32. The insulated glass unit of claim 30 wherein the primary sealant is a rubber based material.

33. The insulated glass unit of claim 31 wherein the glazing bead is a silicone or butyl material.

34. The insulated glass unit of claim 1 wherein the cross-linkers (d) is an alkylsilicate having the formula:

$$(R^{14}O)(R^{15}O)(R^{16}O)(R^{17}O)Si$$

where $R^{14}$, $R^{15}$, $R^{16}$ and $R^{17}$ are chosen independently from monovalent $C_1$ to $C_{60}$ hydrocarbon radicals.

35. The insulated glass unit of claim 1 wherein the sealant composition is at least partially cured.

36. The insulated glass unit of claim 2 wherein the polymer (b) is a linear how density polyethylene and wherein part 1 of the composition further includes a nanoclay.

* * * * *